US006430262B1

(12) United States Patent
Panasik et al.

(10) Patent No.: US 6,430,262 B1
(45) Date of Patent: Aug. 6, 2002

(54) DUAL SUSPENSION BEARINGS FOR X-RAY TUBE

(75) Inventors: Cheryl L. Panasik, Elburn; Nicanor C. Ranchero, Willowbrook, both of IL (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/667,056

(22) Filed: Sep. 21, 2000

(51) Int. Cl.[7] .................................................. H01J 35/10

(52) U.S. Cl. ......................... 378/132; 378/121; 378/123

(58) Field of Search ................................. 378/121, 123, 378/132, 125, 127

(56) References Cited

U.S. PATENT DOCUMENTS

| 4,519,093 | A | * | 5/1985 | Kurihara et al. ............. 378/132 |
| 4,569,070 | A | * | 2/1986 | Schubert et al. ............. 378/132 |
| 5,308,172 | A | * | 5/1994 | Upadhya et al. ............. 384/453 |
| 6,295,338 | B1 | * | 9/2001 | Kuzinar et al. .............. 378/132 |

OTHER PUBLICATIONS

Internet—Wave Springs, Smalley Steel Ring Company, Mar. 15, 2001, www. smalley.com.*
Dunlee Anode Assembly: Drawing No's. 02280 and 87904 Under §2129 of the MPEP, the Applicants hereby make an admission that the Dunlee Anode Assembly shown in the attached references is prior art. Accordingly, under §2129 of the MPEP, the device shown in the attached references should be applied against the present claims as prior art. Moreover, the device shown in the attached references has been on sale and in public use, as those terms are defined in §2133.03 of the MPEP, in the United States for more than a year from the filing date of the present patent application. For these further reasons, the device shown in these references should be considered as prior art.

* cited by examiner

Primary Examiner—David P. Porta
Assistant Examiner—Therese Barber
(74) Attorney, Agent, or Firm—Fay, Sharpe, Fagan, Minnich & McKee, LLP

(57) ABSTRACT

A high energy x-ray tube includes an evacuated chamber (12) containing a rotor (34) which rotates an anode (10) through a stream of electrons (A) in order to generate an x-ray beam (B). The rotor includes an outer cylindrical armature (38) made from a thermally and electrically conductive material. An intermediate cylindrical member (40) circumferentially engages the inside diameter of the armature. The rotor also includes a bearing assembly (C) having a bearing shaft (52) centrally aligned with a longitudinal axis (Z) of the rotor. An inner bearing member (42) is concentrically spaced from the bearing shaft and defines forward and rearward bearing grooves (46F, 46R). Forward and rearward bearing races (70F, 70R) are positioned between the inner bearing member and the bearing shaft. A plurality of forward and rearward bearings (48F, 48R) are dimensioned to be received between the forward and rearward bearing races and bearing grooves, respectively. Forward and rearward biasing spring washers (74F, 74R) apply a continuous, opposite biasing force to the forward and rearward bearing races, respectfully, so that the bearing races urge their respective ball bearings into an optimal operating position.

22 Claims, 4 Drawing Sheets

DUAL SUSPENSION BEARINGS FOR X-RAY TUBE

BACKGROUND OF THE INVENTION

The present invention relates to the vacuum tube arts. It finds particular application in connection with increasing bearing assembly life and reducing undesirable bearing assembly noise in the bearing assembly of a rotating anode x-ray tube and will be described with particular reference thereto. It should be appreciated, however, that the invention is also applicable for increasing bearing assembly life and reducing unwanted bearing assembly noise in other vacuum systems.

A high power x-ray tube typically includes a rotating anode disposed within a glass envelope. A cathode supplies an electron beam to a target surface of the anode. When the electron beam strikes the rotating anode, a portion of the beam is converted to x-rays which pass out of the glass envelope.

An induction motor is typically provided for rotating the anode. The anode is configured to rotate so that the heat energy will be spread over a relatively large area, thereby inhibiting the target area from overheating. The induction motor includes driving coils positioned outside the glass envelope and a rotor within the envelope which is connected to the anode. The rotor includes an outer, cylindrical armature or sleeve and an inner bearing member, which is centrally aligned within the armature. The armature and bearing member are centrally connected to the anode by a neck. A cylindrical bearing shaft is axially aligned with the armature and bearing member and is positioned therebetween. The bearing shaft is connected, at a rearward end, to a housing disposed outside the envelope.

When the motor of a typical x-ray tube is energized, the driving coils induce magnetic fields in the armature which cause the armature and bearing member to rotate relative to the stationary bearing shaft. Bearings, such as ball or roller bearings, are positioned between the bearing member and bearing shaft for allowing the bearing member, armature, and anode to rotate smoothly, relative to the bearing shaft. The bearings are positioned between bearing grooves provided in the bearing member and bearing races provided on the stationary bearing shaft. The bearing grooves and bearing races help maintain the proper positioning of the ball bearings.

Although the bearing assemblies are manufactured with precision tolerances, there are still minor tolerance stack-ups on the order of one or two thousandths of an inch. These tolerance stack-ups create a clearance between the ball bearings and the bearing races. Thus, under the forces exerted by a relatively heavy anode (on the order of 4.5 kg), which is rotated at several thousand RPM's (on the order of 10,000 RPM's), the ball bearings experience unwanted movement and play. Such unwanted movement and play is also experienced when the x-ray tube is rotated such as in a CT scanner. When the ball bearings experience this unwanted movement, they tend to rub up against surfaces they are not intended to rub up against. Additionally, the clearance between the ball bearings and the bearing races permits the ball bearings to rattle back and forth. The undesirable rubbing and rattling creates bearing noise in the bearing assembly. Furthermore, rubbing and rattling reduces the life of the ball bearings.

In an attempt to overcome some of the foregoing problems, a spring member has been provided at one end of the bearing assembly. However, in such a design, the spring member pushed one set of ball bearings toward their respective bearing race and pushed the other set of ball bearings away from their respective bearing race. The ball bearings being pushed away from their bearing race still experienced unwanted rubbing. Thus, those ball bearings generated noise and had a reduced life.

The present invention provides a new and improved bearing assembly and method of operation for an x-ray tube which overcomes the above-referenced problems and others.

SUMMARY OF THE INVENTION

In accordance with one aspect of the present invention, an x-ray tube for providing a beam of x-rays comprises an envelope defining an evacuated chamber. A cathode is disposed within the chamber for providing a source of electrons. An anode, disposed within the chamber, is struck by the electrons, thereby generating x-rays. A rotor is operatively connected to the anode for rotating the anode relative to the cathode. The rotor has a bearing assembly which includes a first bearing race positioned between an inner bearing member and a bearing shaft. The first bearing race has a seat for receiving a first plurality of bearings. A first biasing means applies a continuous force to the first bearing race so that the first bearing race urges the first plurality of bearings into an optimal operating position.

In accordance with another aspect of the present invention, a bearing assembly for a rotor of an x-ray tube includes a bearing shaft centrally aligned with a longitudinal axis of the rotor. An inner bearing member is concentrically spaced from the bearing shaft. A first bearing race is positioned between the inner bearing member and the bearing shaft. A first plurality of bearings are dimensioned to be received between the inner bearing member and the first bearing race. A first biasing means applies a continuous force to the first bearing race so that the first bearing race urges the first plurality of bearings into an optimal operating position.

In accordance with another aspect of the present invention, a method of reducing noise and increasing bearing life in an x-ray tube is provided. The x-ray tube has an anode rotatably connected to a rotor. The rotor has a first bearing race positioned between an inner bearing member and a bearing shaft. The rotor further includes a first plurality of bearings positioned between a seat of the first bearing race and a bearing groove defined by the inner bearing member. The method includes positioning a biasing means behind the first bearing race so that the first bearing race urges the bearings into an optimal operating position.

One advantage of the present invention is that it reduces operating noise.

Another advantage of the present invention is that it increases bearing life.

Another advantage of the present invention resides in the optimal, individual positioning of the ball bearings with respect to the bearing races and bearing grooves.

Still further advantages of the present invention will become apparent to those of ordinary skill in the art upon a reading and understanding of the following detailed description of the preferred embodiment.

BRIEF DESCRIPTION OF THE DRAWINGS

The invention may take form in various components and arrangements of components and in various steps and arrangements of steps. The drawings are only for purposes of illustrating a preferred embodiment, and are not to be construed as limiting the invention.

DETAILED DESCRIPTION OF THE PREFERRED EMBODIMENT

Figure 1:
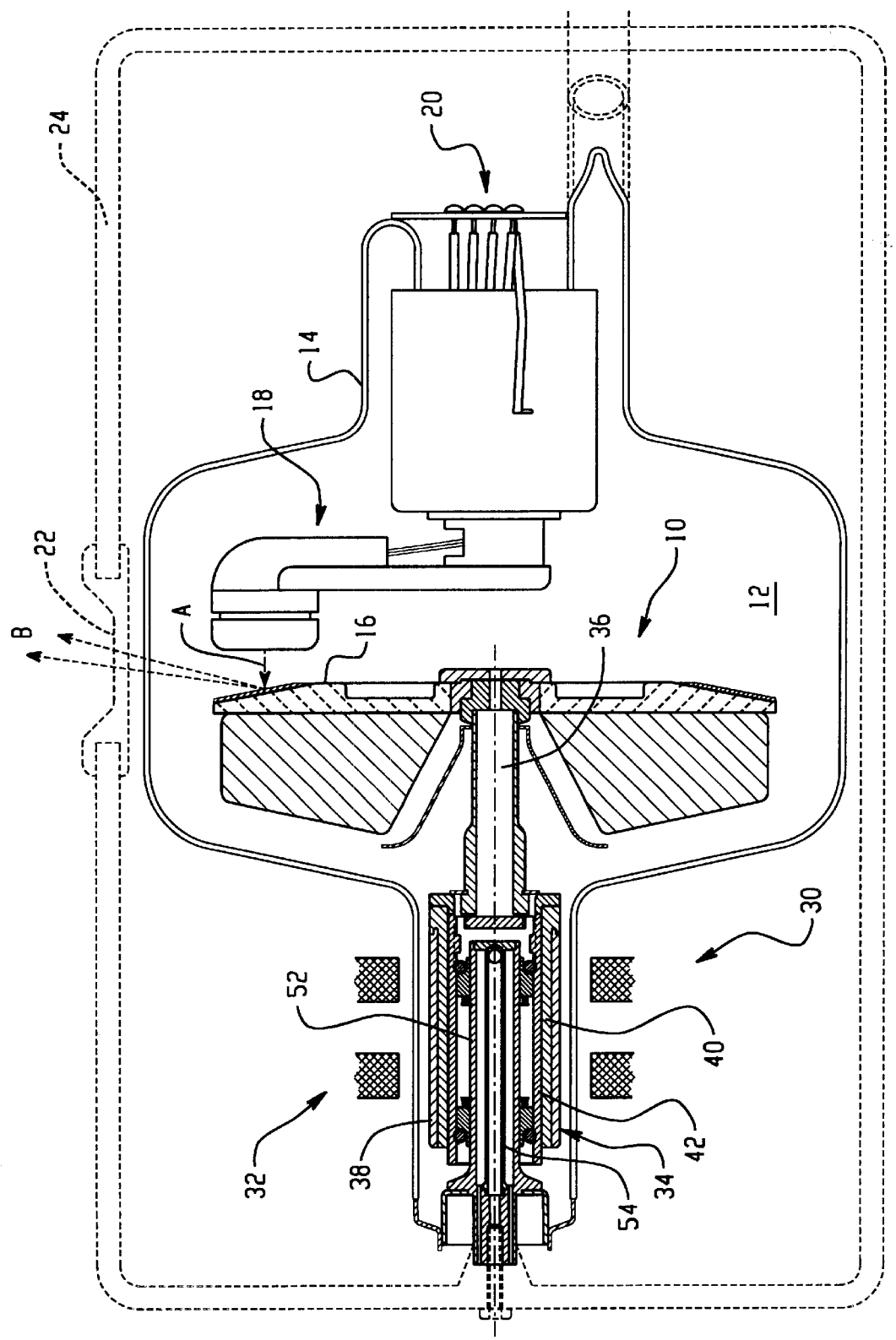
FIG. 1 is a schematic view of an x-ray tube in accordance with the present invention.

With reference to FIG. 1, a rotating anode x-ray tube of the type used in medical diagnostic systems for providing a focused beam of x-ray radiation includes a rotating anode 10 which is operated in an evacuated chamber 12 defined preferably by a glass envelope 14. The anode is disc-shaped and beveled adjacent its annular peripheral edge to define an anode surface or target area 16. A cathode assembly 18 supplies and focuses an electron beam A which strikes the anode surface 16. Leads 20 enter through the glass envelope and are connected to the cathode assembly for supplying an electrical current to the assembly and for providing a high voltage differential between the anode and the cathode. When the electron beam strikes the rotating anode, a portion of the beam is converted into x-rays B which are emitted from the anode surface and through the envelope 14. Upon exiting the envelope, the x-rays leave through a window 22 of a surrounding cooling oil enclosure or housing 24.

Figure 2:
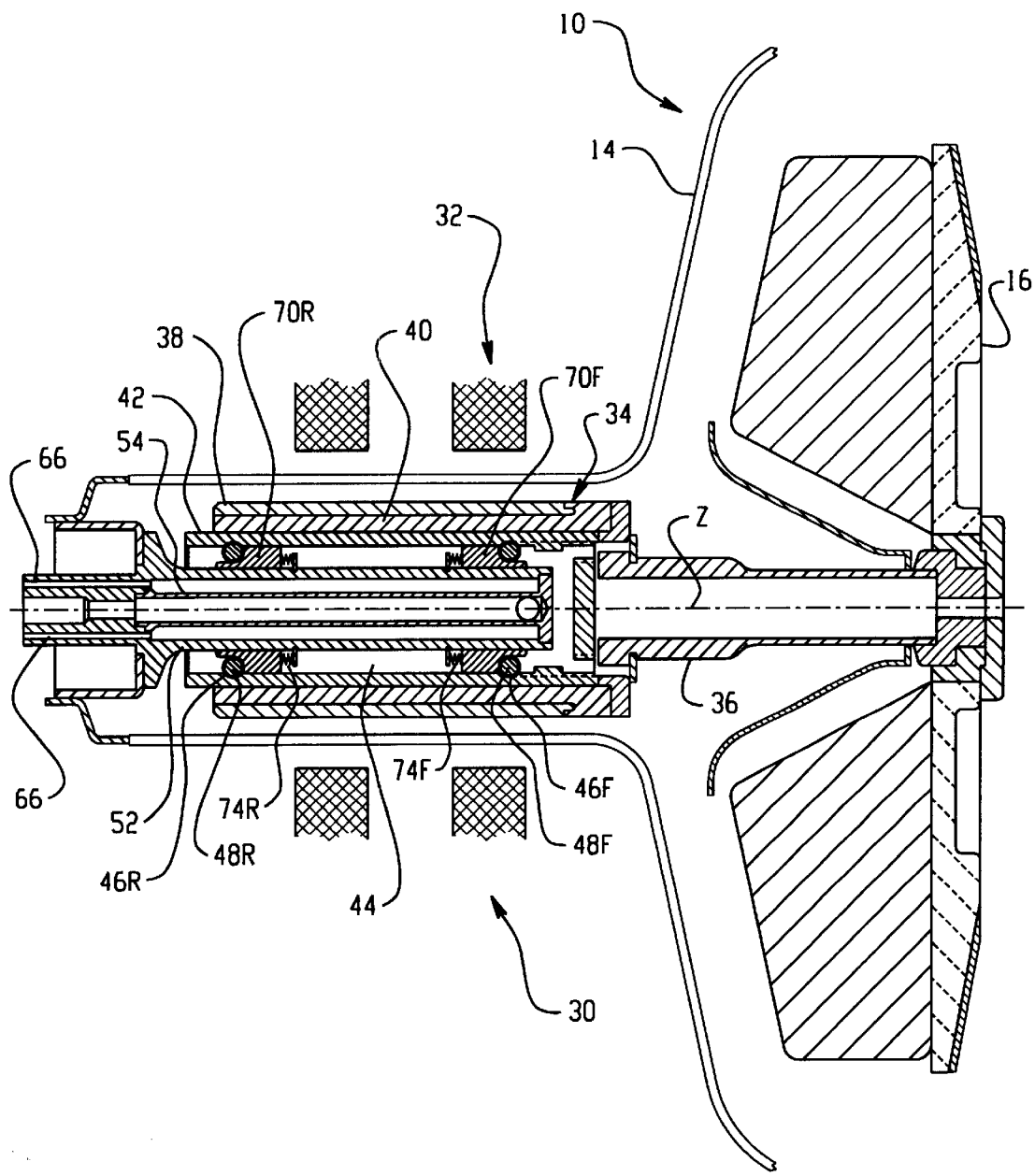
FIG. 2 is a sectional view of the rotor, neck and anode of the x-ray tube of FIG. 1.

With reference also to FIG. 2, an induction motor 30 is provided for rotating the anode 10. The induction motor includes a stator having driving coils 32 which are positioned outside the glass envelope 14. The induction motor further includes a rotor 34, having a substantially cylindrical configuration, disposed within the envelope. The rotor includes a neck 36, which interconnects the rotor 34 with the anode 10, and an outer, cylindrical armature or sleeve portion 38 formed from a thermally and electrically conductive material, such as copper. An intermediate cylindrical member 40, preferably fabricated from steel, circumferentially engages the inside diameter of the armature. The cylindrical member 40 provides rigidity and strength to the rotor.

Figure 3:
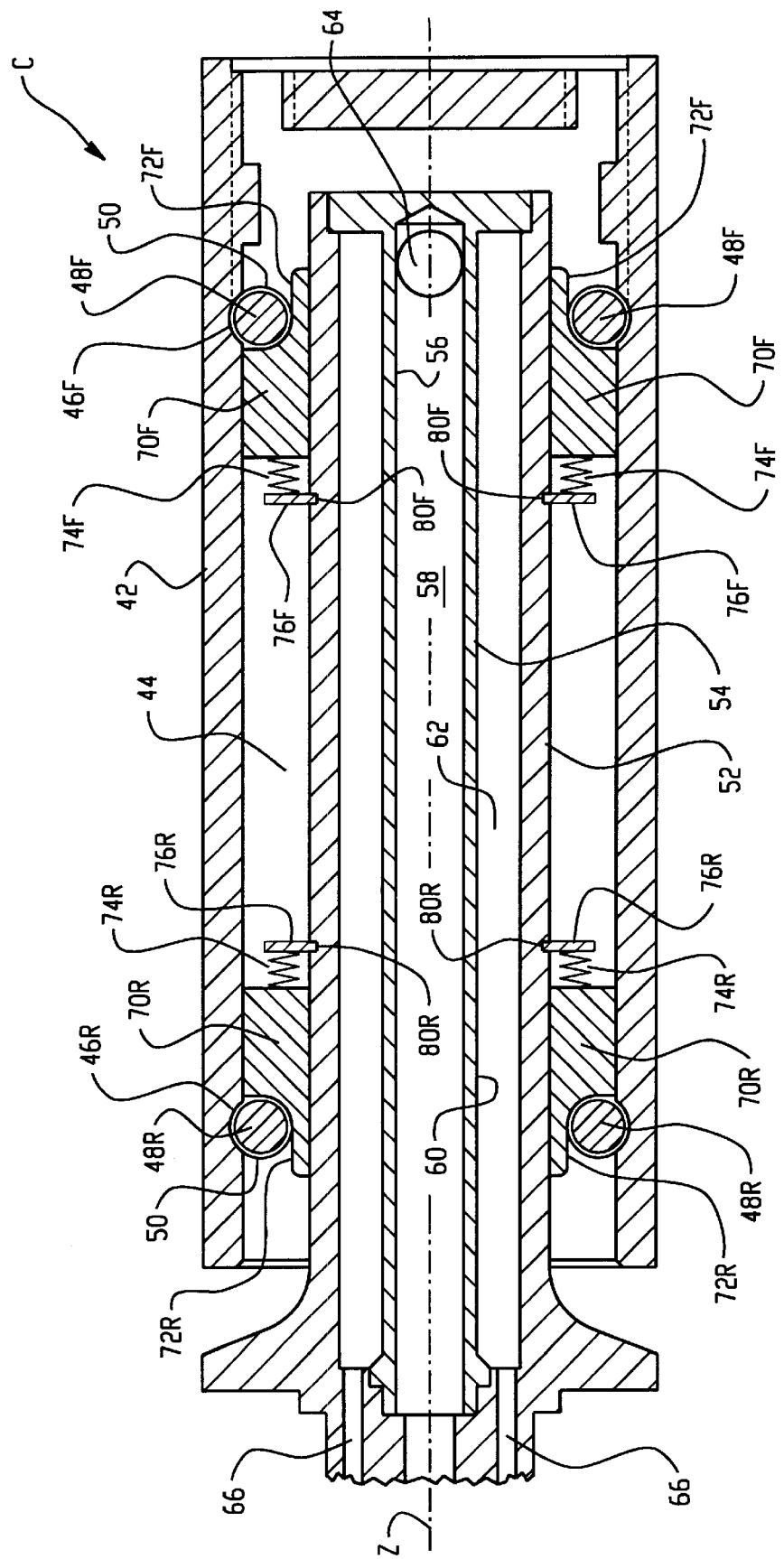
FIG. 3 is a sectional view of the bearing assembly of the x-ray tube of FIG. 1.

With reference also to FIG. 3, the rotor further includes a bearing assembly C. The bearing assembly includes an inner bearing member 42 centrally aligned with the armature and circumferentially engaging the inside diameter of the cylindrical member 40. An inner surface of the bearing member defines a rotor cavity 44. The inner bearing member has forward and rearward bearing grooves 46F, 46R configured to receive forward and rearward bearings 48F, 48R, respectfully, such as ball or roller bearings. Each of the ball bearings is coated with a lubricant 50 (not to scale), such as lead or silver, at a thickness of about 1000–2000 Å. As used herein, the terms "forward" and "rear," and the like, are used to define relative positions of components along a central longitudinal axis Z of the rotor. Components which are described as forward are closer to the anode, while components described as rearward are further from the anode.

The bearing assembly further includes a substantially cylindrical bearing shaft 52 centrally aligned with the rotor and configured to be inserted into the rotor cavity 44. The rearward end of the bearing shaft extends outside the glass envelope 14 and is rigidly connected to the housing 24 (see FIG. 1). The bearing shaft 52 includes an interior annular wall 54 having an inner surface 56 which defines a central bore or passageway 58 (see FIG. 3). Annular wall 54 has an outer surface 60, which with an inner surface of the bearing shaft, defines an annular chamber 62. An opening 64 is provided at the forward end of wall 54, thus providing access from passageway 58 to chamber 62. In operation, a cooling fluid, such as oil, is fed into passageway 58, through opening 64, and into chamber 62. After cooling the bearing assembly, the cooling fluid exits through channels 66 provided at the rearward end of the bearing shaft. The bearing shaft is held stationary with respect to the rotating armature so that the cooling fluid may be continuously fed therethrough.

A first forward bearing race 70F and a second rearward bearing race 70R are circumferentially disposed around forward and rearward portions of the bearing shaft, respectfully. Each bearing race has a seat 72F, 72R formed therein of a generally semicircular shape, which is dimensioned to receive its respective plurality of ball bearings 48F, 48R. The bearing races are configured to urge the ball bearings 48P, 48R into an optimal position within their respective bearing grooves 46F, 46R.

In order to urge the ball bearings into an optimal position, a forward and rearward biasing system 74F, 74R is provided behind the forward and rearward bearing races 70P, 70R, respectfully. In a preferred embodiment, the biasing systems include a spring, such as a wave spring. However, it must be understood that the biasing systems can include any suitable urging member, such as an elastic material, a hydraulic system, coil springs, bellview washers, and the like. In the illustrated embodiment, the springs 74F, 74R preferably have a spring rating of 4.5–9 kg. In order to hold the races and springs in place, retaining rings 76F, 76R are connected to the free ends of the springs 74F and 74R, respectively. Retaining rings 76F and 76R are dimensioned to be snapped into snap ring grooves 80F and 80R, respectfully, which are disposed at predetermined locations along the bearing shaft. The springs and retaining rings are positioned relative to each other to ensure that there will always be a spring force on the bearing races. Thus, the bearing parts, particularly the ball bearings, will stay in their proper location, thereby reducing unwanted movement, noise and wear.

In operation, the induction motor 30 is energized causing the driving coils 32 to induce magnetic fields in the armature 38. The magnetic fields cause the rotor 34 to rotate relative to the stationary bearing shaft 52. As the rotor begins to rotate, the anode 10, which is connected to the rotor via the neck 36, also begins to rotate. In addition, the ball bearings 48F, 48R begin to roll between the bearing grooves 46F, 46R and the bearing races 70F, 70R, becoming extremely hot. A cooling fluid is fed into passageway 58, through opening 62, and into annular chamber 62 where it cools the ball bearings. The cooling fluid ultimately exits through channels 66.

Although the bearing assemblies are manufactured with precision tolerances, there are still minor tolerance stack-ups on the order of one or two thousandths of an inch. These tolerance stack-ups create a clearance between the ball bearings and the bearing races. Thus, under the forces exerted by the relatively heavy anode (on the order of 4.5 kg), which is rotating at several thousand RPM's (on the order of 10,000 RPM's), the ball bearings have a tendency to move and experience unwanted play. If the ball bearings experience this unwanted movement, they will rub up against surfaces they are not intended to rub up against, thus causing undesirable noise and reducing bearing life.

In order to overcome these problems, the biasing systems 74F, 74R continuously urge the bearing races 70F, 70R toward the ball bearings 48F, 48R. Such a continuous spring force dynamically optimizes the seating of the ball bearings. Therefore, unwanted noise is minimized and bearing life is increased. Without the biasing system, the bearing piece parts would be free to move under forces generated during normal x-ray tube operation, such as those generated from rotation of the heavy anode. The biasing systems of the present invention overcome these forces and dynamically maintain each bearing piece in its optimal positions.

Figure 4:
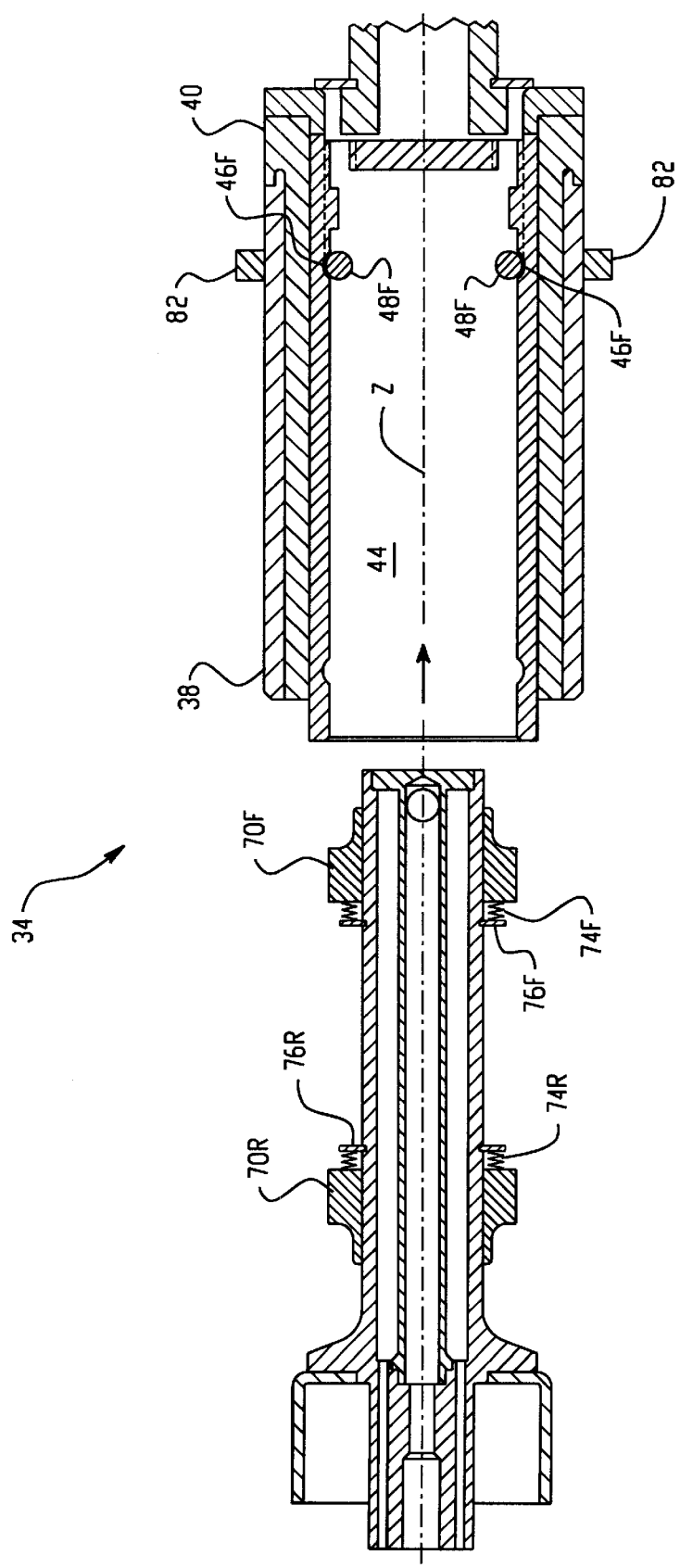
FIG. 4 is a sectional view of the rotor of FIG. 1 before being fully assembled.

With reference to FIG. 4, the method of assembling the rotor 34 and bearing assembly includes placing a magnetic member 82 circumferentially around the perimeter of the rotor and in the same plane as the front bearing groove 46F. The forward ball bearings 48F are dropped into the rotor cavity 44. The magnetic force of the magnetic member pulls the ball bearings into the front bearing groove 46F. The rotor shaft, with the biasing systems 74F, 74R snapped therein, is inserted into the rotor cavity until the front bearing race 70F has adequately secured the front plurality of ball bearings 48F into the front bearing groove. The magnetic member is then removed. Finally, the rear ball bearings 48R are placed into the rotor cavity where they are secured between the rear bearing race 70R and the rear bearing groove 46R (see FIG. 3).

The invention has been described with reference to the preferred embodiments. Obviously, modifications and alterations will occur to others upon reading and understanding the preceding detailed description. It is intended that the invention be construed as including all such modifications and alterations in so far as they come within the scope of the appended claims or the equivalents thereof.

Having thus described the preferred embodiment, the invention is now claimed to be:

1. An x-ray tube for providing a beam of x-rays, the tube comprising:
    an envelope which defines an evacuated chamber;
    a cathode disposed within the chamber for providing a source of electrons;
    an anode disposed within the chamber positioned to be struck by the electrons and generate x-rays;
    a rotor operatively connected to the anode for rotating the anode relative to the cathode, the rotor having a bearing assembly which includes:
        a central shaft connected with one of the anode and the envelope;
        a tubular bearing member surrounding and spaced from the shaft, the bearing member connected with the other of the anode and the envelope;
        a first bearing mounted between the central shaft and the bearing member, the first bearing member including:
            an outer race on the bearing member,
            an inner race slidably mounted on the shaft for longitudinal sliding movement therealong, and
            a plurality of bearing elements rotatably supported between the inner and outer races of the first bearing;
        a first spring which applies a longitudinal biasing force to the first bearing inner race;
        a second bearing mounted between the central shaft and the bearing member, the second bearing including:
            an outer race on the bearing member,
            an inner race slidably mounted on the shaft for longitudinal sliding movements therealong, and
            a plurality of bearing elements rotatably supported between the inner and outer races of the second bearing;
        a second spring which applies a longitudinal biasing force to the second bearing inner race.

2. The x-ray tube of claim 1, wherein the first and second bearing inner races are biased in opposite directions.

3. An x-ray tube for providing a beam of x-rays, the tube comprising:
    an envelope which defines an evacuated chamber;
    a cathode disposed within the chamber for providing a source of electrons;
    an anode disposed within the chamber positioned to be struck by the electrons and generate x-rays;
    a rotor operatively connected to the anode for rotating the anode relative to the cathode, the rotor having a bearing assembly which includes:
        a first bearing race positioned between an inner bearing member and a bearing shaft, the first bearing race having a seat for receiving a first plurality of bearings,
        a first biasing system applying a continuous force to the first bearing race so that the first bearing race urges the first plurality of bearings into an optimal operating position,
        a second bearing race spaced from the first bearing race and disposed between the bearing member and the bearing shaft, the second bearing race having a seat for receiving a second plurality of bearings, and
        a second biasing system, operatively spaced from the first biasing system, the second biasing system applying a continuous force to the second bearing race independent of the force applied to the first bearing race so that the second bearing race urges the second plurality of bearings into an optimal operating position.

4. The x-ray tube of claim 3, wherein the first biasing system includes a first spring loaded member and the second biasing system includes a second spring loaded member.

5. The x-ray tube of claim 4, further comprising:
    a first retaining ring connected to a free end of the first spring loaded member, the first retaining ring being dimensioned to snap into a snap ring groove disposed at a predetermined location along the bearing shaft; and
    a second retaining ring connected to a free end of the second spring loaded member, the second retaining ring being dimensioned to snap into a snap ring groove disposed at a predetermined location along the bearing shaft.

6. The x-ray tube of claim 4, wherein each of the spring loaded members is a wave spring having a spring rating of between 4.5 and 9 kg.

7. The x-ray tube of claim 3, wherein the first and second bearing races are independently biased into optimal operating positions.

8. The x-ray tube of claim 3, wherein the bearing shaft is stationary relative to the anode and inner bearing member.

9. The x-ray tube of claim 8, wherein the rotor of the x-ray tube further includes:
    a rigid member axially aligned with and circumferentially engaging the inner bearing member for providing rigidity to the rotor;
    an armature axially aligned with and circumferentially engaging the rigid member; and
    a neck interconnecting the rotor to the anode.

10. The x-ray tube of claim 3, wherein each of the first plurality and second plurality of bearings are ball bearings coated with a lubricant.

11. An x-ray tube for providing a beam of x-rays, the tube comprising:

an envelope which defines an evacuated chamber;

a cathode disposed within the chamber for providing a source of electrons;

an anode disposed within the chamber positioned to be struck by the electrons and generate x-rays;

a rotor operatively connected to the anode for rotating the anode relative to the cathode, the rotor having a bearing assembly which includes:

a bearing member, an outer surface of the bearing member defining first and second bearing grooves for receiving a first plurality of bearings and a second plurality of bearings, respectively, a bearing shaft spaced radially inwardly of the bearing member, and a first bearing race positioned between the first plurality of bearings and the bearing shaft, the first bearing race having a seat for receiving the first plurality of bearings;

a second bearing race positioned between the rotating shafts and the second plurality of bearings; and a first biasing system applying a continuous force to the first bearing race so that the first bearing race urges the first plurality of bearings into an optimal operating position in the first groove.

12. A method of manufacturing an x-ray tube which includes a rotor including a bearing shaft and a tubular bearing member spaced from the bearing shaft, a first bearing race and a second bearing race positioned between the bearing member and the bearing shaft, the method comprising:

positioning a first plurality of bearings in a first bearing groove of the bearing member;

inserting the bearing shaft into a cavity defined by the bearing member;

biasing the first bearing race with a first biasing system so that a seat of the first bearing race urges the first plurality of bearings in the first bearing groove;

positioning a second plurality of bearings between a second bearing groove of the inner bearing member and the second bearing race; and biasing the second bearing race with a second biasing system spaced and independent from the first biasing system so that a seat of the second bearing race urges the second plurality of bearings in the second bearing groove.

13. A method of manufacturing an x-ray tube comprising the steps of:

positioning a first plurality of bearings in a first inward facing bearing groove of a bearing member, including placing a magnetic member against an outer surface of the bearing member in aligned relation with the first bearing groove in order to hold the first plurality of bearings in place during assembly;

while holding the bearings in place with the magnetic member, inserting a bearing shaft with an outward facing bearing race into a cavity defined in the bearing member such that a seat of the outward facing bearing race engages the plurality of bearings and urges the first plurality of bearings in the inward facing bearing groove; and positioning a second plurality of bearings between a second inward facing bearing groove of the bearing member and a second bearing race carried by the bearing shaft.

14. A bearing assembly for a rotor of an x-ray tube, the bearing assembly comprising:

a bearing shaft centrally aligned with a longitudinal axis of the rotor;

a bearing member concentrically outwardly spaced from the bearing shaft, the bearing member defining a first groove facing the bearing shaft;

a first bearing race positioned between the inner bearing member and the bearing shaft;

a first plurality of bearings dimensioned to be received between the bearing member groove and the first bearing race; and a first biasing system applying a continuous force to the first bearing race so that the first bearing race urges the first plurality of bearings into an optimal operating position.

15. The bearing assembly of claim 14, wherein the first biasing system includes a spring loaded washer.

16. A bearing assembly for an x-ray tube rotor, the bearing assembly comprising:

a bearing shaft centrally aligned with a longitudinal axis of the rotor;

a cylindrical bearing member concentrically spaced from the bearing shaft;

a first bearing race slidably positioned around the bearing shaft;

a second bearing race on the bearing member;

a first plurality of bearings rollingly received between the first bearing race and the second bearing race;

a first spring loaded washer surrounding the shaft to apply a biasing force to the first bearing race; and a retainer engaging a side of the spring loaded washer opposite to the first bearing race, the retainer being disposed at a predetermined location along the bearing shaft.

17. A bearing assembly for a rotor of an x-ray tube, the bearing assembly comprising:

a bearing shaft aligned with a longitudinal axis of the rotor;

a bearing member concentrically spaced around the bearing shaft;

a first bearing race positioned for longitudinal sliding motion between the bearing member and the bearing shaft, the second bearing race having a seat for receiving a first plurality of bearings;

a first biasing system applying a continuous longitudinal force to the first bearing race so that the first bearing race urges the first plurality of bearings toward an optimal operating position;

a second bearing race spaced from the first bearing race and disposed for longitudinal sliding motion between the bearing member and the bearing shaft, the second bearing race having a seat for receiving a second plurality of ball bearings; and a second biasing system spaced from the first biasing system and applying a continuous longitudinal force to the second bearing race independent of the biasing force applied to the first bearing race so that the second bearing race urges the second plurality of bearings toward an optimal operating position.

18. The bearing assembly of claim 17 further including:

a retaining system disposed between the bearing races, the retaining system having oppositely disposed faces for engaging the first and second biasing systems, the first and second biasing systems being disposed between the retaining system and the bearing races such that the bearing races are biased apart.

19. The bearing assembly of claim 18 wherein the retaining system includes a pair of snap rings that are received in grooves in the inner bearing member.

20. The bearing assembly of claim 19 wherein the first and second biasing systems include spring loaded washers.

21. A method of reducing noise and increasing bearing life in an x-ray tube having an anode rotatably connected to a rotor, the rotor having a first bearing race positioned between a tubular bearing member and a bearing shaft spaced radially inwardly of the bearing member and a first plurality of bearings positioned between a seat of the first bearing race and a bearing groove defined by the inner bearing member, the method comprising:

biasing the first bearing race so that the first bearing race urges the bearings into an optimal operating position in the groove.

22. The method of claim 21 wherein the rotor has a second bearing race and a second bearing groove and further including:

resiliently biasing the first and second bearing races in opposite directions.

* * * * *